(12) United States Patent
Flores et al.

(10) Patent No.: US 9,894,178 B2
(45) Date of Patent: Feb. 13, 2018

(54) LEVERAGING SOCIAL NETWORKS IN PHYSICAL GATHERINGS

(71) Applicant: International Business Machines Corporation, Armonk, NY (US)

(72) Inventors: Christina I. Flores, Keller, TX (US); Romelia H. Flores, Keller, TX (US); Leonard S. Hand, Red Creek, NY (US); Timothy C. Kwan, Grand Prairie, TX (US); Michael A. Lau, Arlington, TX (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 14/704,145

(22) Filed: May 5, 2015

(65) Prior Publication Data

US 2016/0330290 A1 Nov. 10, 2016

(51) Int. Cl.
| | | |
|---|---|---|
| *G06F 15/16* | (2006.01) | |
| *H04L 29/08* | (2006.01) | |
| *H04L 12/58* | (2006.01) | |
| *H04N 7/15* | (2006.01) | |
| *H04L 29/06* | (2006.01) | |
| *H04L 12/18* | (2006.01) | |
| *H04N 21/239* | (2011.01) | |
| *H04N 1/00* | (2006.01) | |
| *G06F 17/30* | (2006.01) | |

(Continued)

(52) U.S. Cl.
CPC .............. *H04L 67/306* (2013.01); *G06F 8/61* (2013.01); *G06F 9/44521* (2013.01); *G06F 17/30179* (2013.01); *H04L 12/1822* (2013.01); *H04L 51/32* (2013.01); *H04L 63/102* (2013.01); *H04L 63/104* (2013.01); *H04L 65/403* (2013.01); *H04L 65/4084* (2013.01); *H04L 67/06* (2013.01); *H04L 67/10* (2013.01); *H04L 67/1097* (2013.01); *H04L 67/125* (2013.01); *H04L 67/34* (2013.01); *H04N 1/00* (2013.01); *H04N 7/147* (2013.01); *H04N 7/15* (2013.01); *H04N 21/2393* (2013.01)

(58) Field of Classification Search
CPC . H04L 67/306; H04L 65/403; H04L 12/1822; H04L 63/102; H04L 65/4084; H04L 63/104; H04L 67/1097; H04L 67/06; H04L 67/34; H04L 67/125; H04L 67/10; H04N 7/15; H04N 21/2393; H04N 1/00; H04N 7/147; G06F 17/30719; G06F 8/61; G06F 9/44521
USPC .................... 709/203–204; 348/14.01, 14.08
See application file for complete search history.

(56) References Cited

U.S. PATENT DOCUMENTS

| | | |
|---|---|---|
| 7,788,188 B2 | 8/2010 | Kramer |
| 8,214,242 B2 * | 7/2012 | Agapi .................. G06Q 10/109 705/7.19 |
| 8,521,824 B2 | 8/2013 | Baransky et al. |

(Continued)

*Primary Examiner* — Chris Parry
*Assistant Examiner* — Weiwei Stiltner
(74) *Attorney, Agent, or Firm* — Robert C. Bunker

(57) ABSTRACT

Embodiments of the present invention provide methods, computer program products, and systems for leveraging social networks in physical gatherings. Embodiments of the present invention generate profiles for participants at the physical gathering. Embodiments of the present invention can enrich the participants experience at the physical gathering by providing information to the participant, based on the profile for the participant.

17 Claims, 5 Drawing Sheets

(51) Int. Cl.
    *G06F 9/445*     (2006.01)
    *H04N 7/14*     (2006.01)

(56) References Cited

U.S. PATENT DOCUMENTS

| | | |
|---|---|---|
| 2008/0300937 A1 | 12/2008 | Allen et al. |
| 2008/0312946 A1 | 12/2008 | Valentine et al. |
| 2011/0035680 A1 | 2/2011 | Borovoy et al. |
| 2012/0054008 A1 | 3/2012 | Watfa et al. |
| 2012/0224021 A1* | 9/2012 | Begeja ............... H04N 7/147 348/14.08 |
| 2013/0282421 A1 | 10/2013 | Graff et al. |
| 2014/0108526 A1 | 4/2014 | Garcia-Barrio et al. |
| 2014/0181696 A1* | 6/2014 | Christensen ............ H04M 3/56 715/756 |
| 2014/0229471 A1* | 8/2014 | Galvin, Jr. .......... G06F 17/3061 707/725 |
| 2014/0358632 A1* | 12/2014 | Graff ................ H04L 12/6418 705/7.29 |
| 2015/0379478 A1* | 12/2015 | Klemm ............. G06Q 10/1095 705/7.19 |
| 2016/0259829 A1 | 9/2016 | Heiferman et al. |

\* cited by examiner

LEVERAGING SOCIAL NETWORKS IN PHYSICAL GATHERINGS

BACKGROUND OF THE INVENTION

The present invention relates generally to the field of social networks, and more particularly to leveraging social networks in physical gatherings.

Physical gatherings (e.g., conferences, expos, gatherings, special interest meetings, etc.) enable different types of participants of the physical gathering to interact with each other. Typically a physical gathering involves different types of participants, such as, general attendees, subject matter experts, speakers, administrative staff, and gathering facilitators. For example, one participant (e.g., a general attendee) of the physical gathering may wish to interact with (e.g., discuss a newly published article of a particular technical field) a second participant of the physical gathering (e.g., an accredited technical expert). Furthermore, information may be presented to a participant to enhance the participant's experience at the physical gathering.

SUMMARY

According to one embodiment of the present invention, a method for leveraging social networks in physical gatherings is provided. The method includes: generating, by one or more computer processors, a profile for each participant of one or more participants at a physical gathering; receiving, by one or more computer processors, data from one or more computer systems associated with the one or more participants of the physical gathering, wherein each participant of the one or more participants is associated with a computer system; receiving, by one or more computer processors, a request for information from a computer system associated with a first participant of the one or more participants of the physical gathering; determining, by one or more computer processors, whether the first participant has access to the information requested based on the profile for the first participant; responsive to determining that the first participant has access to the information requested, analyzing, by one or more computer processors, the data received from the one or more computer systems associated with the one or more participants of the physical gathering to identify data to provide to the first participant to fulfill the request for information; and providing, by one or more computer processors, the identified data to the computer system associated with the first participant of the physical gathering.

According to another embodiment of the present invention, a computer program product for leveraging social networks in physical gatherings is provided. The computer program product comprises a computer readable storage medium and program instructions stored on the computer readable storage medium. The program instructions include: program instructions to generate a profile for each participant of one or more participants at a physical gathering; program instructions to receive data from one or more computer systems associated with the one or more participants of the physical gathering, wherein each participant of the one or more participants is associated with a computer system; program instructions to receive a request for information from a computer system associated with a first participant of the one or more participants of the physical gathering; program instructions to determine whether the first participant has access to the information requested based on the profile for the first participant; program instructions to, responsive to determining that the first participant has access to the information requested, analyze the data received from the one or more computer systems associated with the one or more participants of the physical gathering to identify data to provide to the first participant to fulfill the request for information; and program instructions to provide the identified data to the computer system associated with the first participant of the physical gathering.

According to another embodiment of the present invention, a computer system for leveraging social networks in physical gatherings is provided. The computer system includes one or more computer processors, one or more computer readable storage media, and program instructions stored on the computer readable storage media for execution by at least one of the one or more processors. The program instructions include: program instructions to generate a profile for each participant of one or more participants at a physical gathering; program instructions to receive data from one or more computer systems associated with the one or more participants of the physical gathering, wherein each participant of the one or more participants is associated with a computer system; program instructions to receive a request for information from a computer system associated with a first participant of the one or more participants of the physical gathering; program instructions to determine whether the first participant has access to the information requested based on the profile for the first participant; program instructions to, responsive to determining that the first participant has access to the information requested, analyze the data received from the one or more computer systems associated with the one or more participants of the physical gathering to identify data to provide to the first participant to fulfill the request for information; and program instructions to provide the identified data to the computer system associated with the first participant of the physical gathering.

DETAILED DESCRIPTION

Embodiments of the present invention provide systems, methods, and computer program products for leveraging social networks in physical gatherings. Embodiments of the present invention associate a computer system with a participant of a physical gathering. Embodiments of the present invention enable participants of the physical gathering to more easily interact with other participants of the physical gathering, as well as receive information and/or updates pertinent to the physical gathering.

Figure 1:
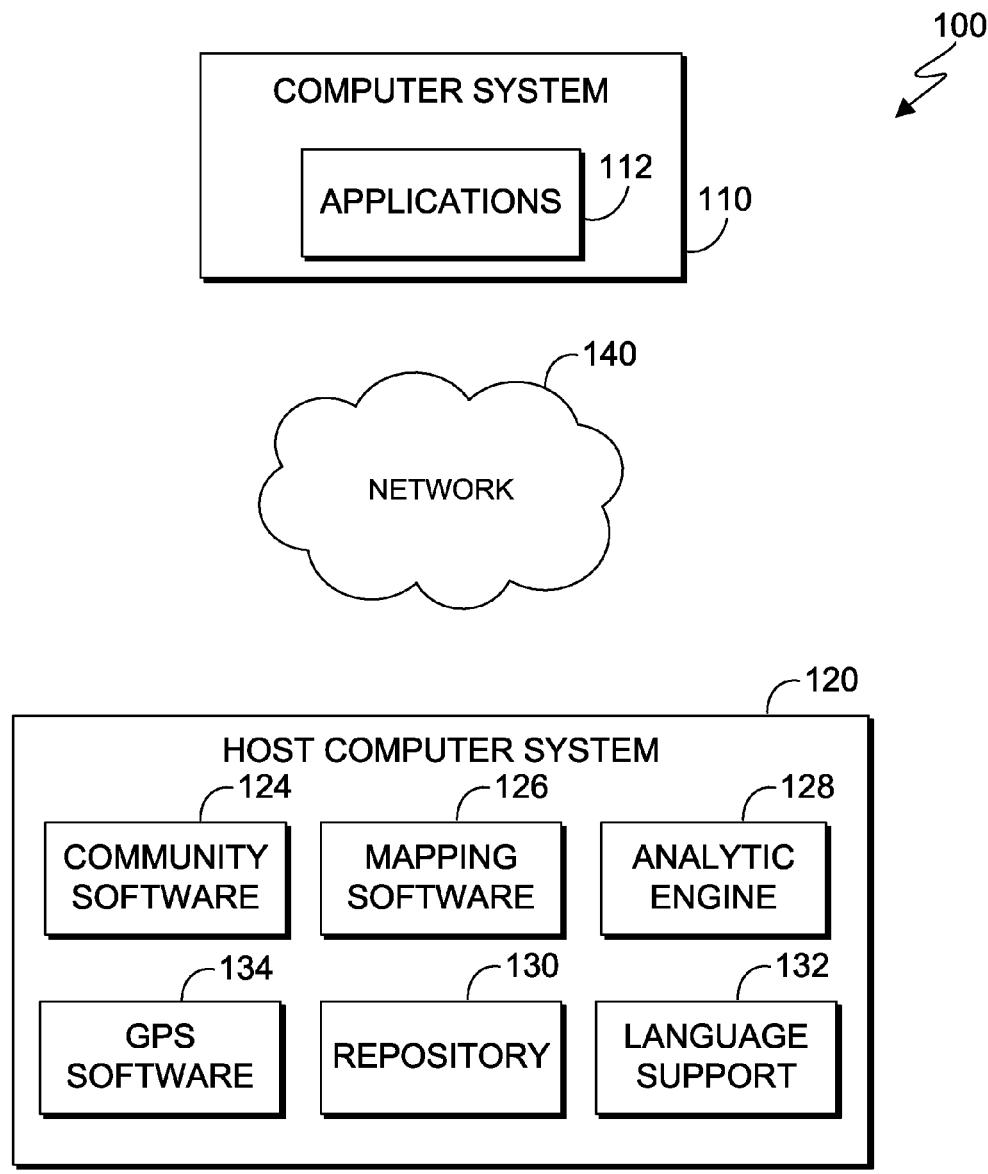
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 110, and host computer system 120, interconnected via network 140. Computer system 110 and host computer system 120 can be desktop computers, laptop computers, specialized computer servers, or any other computer systems known in the art. In certain embodiments, computer system 110 and host computer system 120 represent computer systems utilizing clustered computers and components to act as a single pool of seamless resources when accessed through network 140. For example, such embodiments may be used in data center, cloud computing, storage area network (SAN), and network attached storage (NAS) applications. In general, computer system 110 and host computer system 120 are representative of any electronic devices, or combination of electronic devices, capable of executing computer readable program instructions, as described in greater detail with regard to FIG. 5.

Network 140 can be, for example, a local area network (LAN), a wide area network (WAN) such as the Internet, or a combination of the two, and include wired, wireless, or fiber optic connections. In general, network 140 can be any combination of connections and protocols that will support communications between computer system 110 and host computer system 120, in accordance with an embodiment of the present invention.

In one embodiment, computer system 110 includes applications 112. In this embodiment, participants use computer systems similar to computer system 110 and interact with applications 112 at a physical gathering. Furthermore, participants of the physical gathering may include, but not limited to, attendees, facilitators, and attendee leaders. Participants that are attendees may be categorized further based on the participant's role at the physical event, as described in greater detail later in this specification. Applications 112 are one or more software programs capable of receiving inputs from a participant using computer system 110, transmit received inputs to host computer system 120, and present information provided by host computer system 120 to the participant using computer system 110. In this embodiment, applications 112 include a plurality of software programs, including, but not limited to, graphical user interface (GUI) components, search components, language support components, preference components, scheduling/calendar components, notification components, mapping components, and contact components, as described in greater detail with regard to FIG. 2. Furthermore, data for all participants, venue, physical gathering operations, and any other pertinent data is exchanged between host computer system 120 and computer system 110 via network 140.

In one embodiment, host computer system 120 includes, community software 124, mapping software 126, analytic engine 128, repository 130, language support 132, and GPS software 134. In this embodiment, host computer system 120 contains necessary components for operating and leveraging social network capabilities in physical gatherings. Furthermore, participants that may use host computer system 120 include, but not limited to, attendees, facilitators and administrators. In this embodiment, facilitator's primary purpose is to promote communications, interactions, and other social aspects of the physical gathering. Facilitators serve as moderators, messengers, schedulers, etc. For example, facilitators ensure that the physical gathering operates as intended, and react appropriately to when the physical gathering does not operate as intended. In this embodiment, administrators are information technology (IT) personal for the physical gathering. Furthermore, administrators support functionality of network 140, and electronic devices used in computing environment 100 (e.g., host computer system 120, user computer system 110, etc.).

In one embodiment, community software 124 includes applications that are typically implemented in social networking environments (e.g., applications that support: chat, blog, file share, etc.). In this embodiment, community software 124 includes various capabilities (e.g., chat, text messaging, etc.).

In one embodiment, mapping software 126 utilizes information received from GPS software 134 to generate a visual representation of a venue of the physical gathering. In this embodiment, mapping software 126 receives up to date information to generate a dynamic, interactive visual representation of the venue (e.g., a map that indicates participant locations, indicates key contacts, active conversations, etc.).

In one embodiment, analytic engine 128 processes data that is generated by participants throughout the physical gathering. In this embodiment, analytic engine 128 processes data such as, participant profile information, participant activity, etc. Furthermore, analytic engine 128 can help make recommendations and provide predictive analysis, based, at least in part on, the processed data.

In one embodiment, repository 130 is a storage component that contains data generated throughout the physical gathering. In this embodiment, repository 130 contains information at an individual (i.e., participant) level as well as at an event/venue level. In certain embodiments, repository can comprise one or more data stores on one or more computer systems. Furthermore, host computer system 120 and components therein transmit and retrieve information from repository 130 for subsequent processing.

In one embodiment, language support 132 is a component that supports speech-to-text and text-to-speech capabilities. In this embodiment, language support 132 is capable of translating between languages to facilitate communication between participants that speak different languages.

In one embodiment, GPS software 134 is a component that processes mapping information transmitted from each computer system connected to network 140 in computing environment 100. In this embodiment, GPS software 134 uses a venue map from mapping software 126 for the physical gathering and generates real-time updates to be shown on the venue map (e.g., 5 star attendee active conversations, speaker locations, attendees of interest's locations, number of attendees per room, etc.).

Figure 2:
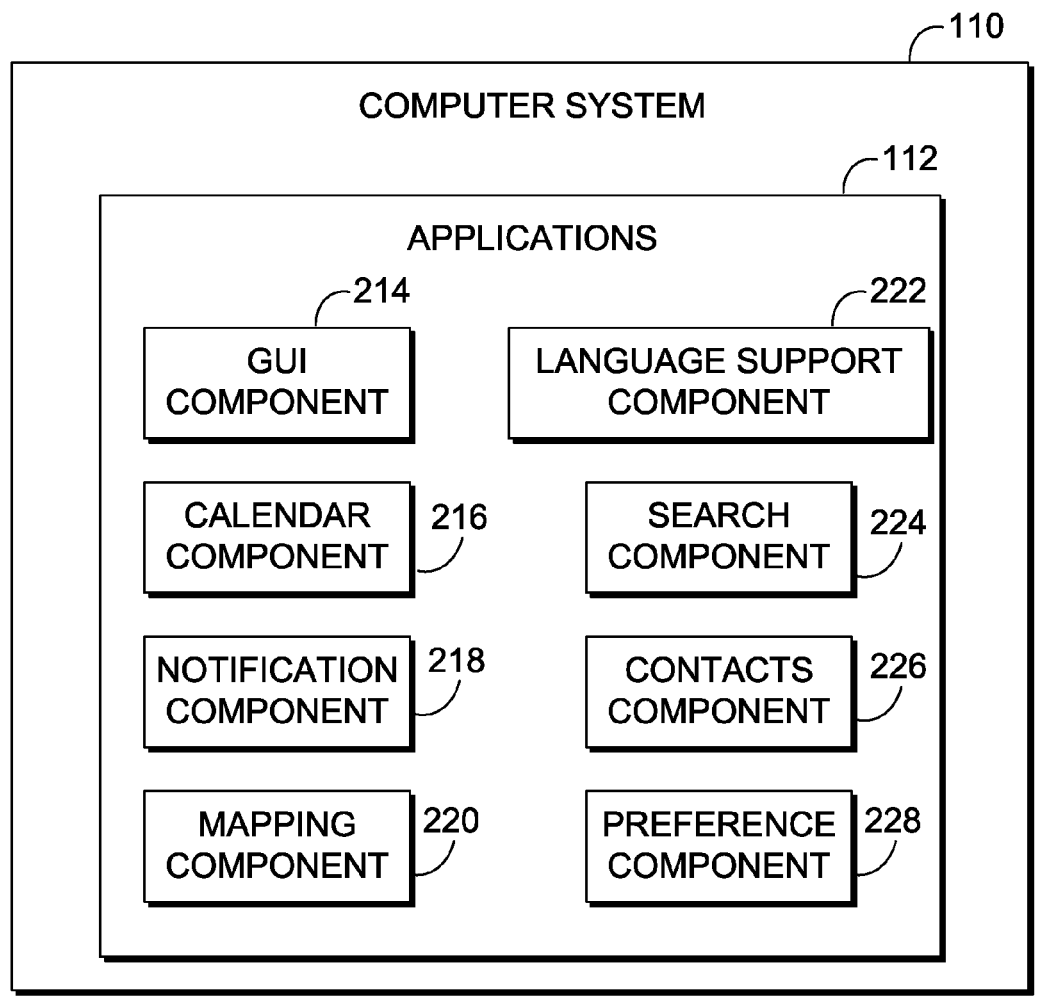
FIG. 2 is a block diagram of the computer system of FIG. 1, in accordance with an embodiment of the present invention.

FIG. 2 is a functional block diagram of computer system 110 of FIG. 1, in accordance with an embodiment of the present invention. In this embodiment, computer system 110 includes applications 112. As previously discussed, each of a plurality of participants is assigned to a computer system similar to computer system 110.

Applications 112 are one or more software programs capable of receiving inputs from a participant using computer system 110, transmit received inputs to host computer system 120, and present information provided by host computer system 120 to the participant using computer system 110, as previously discussed. In this embodiment, different types of participants (e.g., attendees, facilitators, physical gathering leaders, etc.) have different access to one or more applications 112 and/or functions of the one or more applications 112 based, at least in part, on the type of participant. Applications 112 include GUI component 214, calendar component 216, notification component 218, mapping component 220, language support component 222, search component 224, contacts component 226, and preference component 228.

In one embodiment, GUI component 214 enables the participant using computer system 110 to interact with computer system 110 through graphical icons, visual indicators, textual elements, etc. For example, facilitators and physical gathering leaders have access to a dashboard that provides various statistics pertinent to operating the physical gathering (e.g., network operations, data analytics based output, etc.) In another example, a facilitator or a physical gathering leader may limit functionality and/or access of GUI component 214 to attendees at the physical gathering using computer system 110.

In one embodiment, calendar component 216 enables participants using computer system 110 to provide scheduled events, create ad hoc meetings, invite participants, recommend scheduling times, etc. Furthermore, participants using computer system 110 may have access to view other participant's schedule. In one embodiment, facilitators may have access to additional features of calendar component 216. For example, facilitators can modify scheduled events, view attendee statuses, etc.

In one embodiment, notification component 218 enables participants using computer system 110 to receive information pertinent to the physical gathering via notifications. For example, sponsors (i.e., facilitators), physical gathering leaders, and/or administrators may send a notification to all participants of the physical gathering indicating changes to a venue of the physical gathering or changes to scheduling of the physical gathering. Furthermore, facilitators and physical gathering leaders may use notification component 218 to notify participants with updated statuses for scheduled events at the physical gathering (e.g., busy, closed, open, etc.) and/or updated statuses for participants of the physical gathering (e.g., do not disturb, in an event, outside venue, etc.).

In one embodiment, mapping component 220 enables participants using computer system 110 to interact with a dynamic map of the venue. In this embodiment mapping component 220 receives the dynamic map of the venue from host computer system 120 via network 140, comprising real-time updates of participant locations, event locations, etc. In one embodiment, facilitators are offered advanced viewing capabilities of the dynamic map (e.g., additional information pertinent to location of participants, etc.). In yet another embodiment, physical gathering leaders are offered additional viewing capabilities, such as viewing heat maps, foot traffic patterns, etc.

In one embodiment, language support component 222 allows participants using computer system 110 to use text-to-speech capabilities, as well as voice commands and translations. In this embodiment, language support component 222 communicates with host computer system 120 and components therein (e.g., language support 132) to receive appropriate language to language translations, text-to-speech, and/or speech-to-text information. Furthermore, language support component 222 may also include additional components, such as a microphone support and a speaker support that may be activated automatically to send and receive audio signals.

In one embodiment, language support component 222 interacts with host computer system 120 and components therein to alert participants when an active conversation of interest is taking place. For example, an attendee's profile may specify to automatically notify the attendee when an active conversation of interest is taking place between two experts in the field (e.g., two 3+ star participants). In this instance, language support component 222 and components therein monitor conversations taking place at the physical gathering. Furthermore, analytic engine 128 may analyze the monitored conversation to identify a topic of conversation. If the identified topic of conversation were to match the interest indicated by the profile associated with the participant, then the participant is notified of the active conversation as well as other information (e.g., mapping location of the active conversation, participant information of each member of the conversation party, etc.). In yet another embodiment, one or more conversations are identified between two or more participants of the physical gathering that are discussing one or more topics. In another example, a participant may use voice commands for various functions (e.g., update a profile for the participant, update preferences of the participant, etc.). In this instance, the participant may provide updated information by inputting a voice command such as "Basket weaving—Skill Gained", and accordingly, language support component 222 communicates with computer system 110 and host computer system 120 to update necessary components with the information the participant provided. Other voice commands may include, "John Doe—Contact Made", and "At Basket weaving station 1—Post to Social Media", etc.

In one embodiment, search component 224 enables participants using computer system 110 to search (e.g., basic, fuzzy, detailed searches) for information pertinent to the physical gathering used by applications 112. In one embodiment, physical gathering leaders can perform additional and more detailed searches (e.g., searching for what conversations took place, events that participants attended, etc.).

In one embodiment, contacts component 226 enables participants using computer system 110 to contact (e.g., ping, call, etc.) other participants of the physical gathering. Furthermore, contacts component 226 may organize a list of participants based on a participant's preference. For example, an attendee may wish to obtain a list of contacts of all 3 star, 4 star, and/or 5 star participants (i.e., participants that are speakers at the physical gathering, experts on a subject matter of interest, reputable experience in the subject matter of interest, etc.) and filter 2 star and/or 1 star participants (i.e., participants that provide lesser input on a subject matter of interest, an inexperienced participant in the subject matter of interest, etc.).

In one embodiment, preference component 228 enables participants using computer system 110 to customize computer system 110 and other user preference settings. In one embodiment, certain features of preference component 228 may not be available to attendees. For example, facilitators and/or physical gathering leaders may disable an option for attendees to turn off network connectivity of computer system 110.

Accordingly, participants using computer systems similar to computer system 110 at a physical gathering are enabled to more effectively contribute to the physical gathering, network with other participants at the physical gathering, leverage information provided by their computer systems to enhance the participant's experience at the physical gathering, and have access to highlights, reports, and summaries of the physical gathering operations, events of the physical gathering, and topics discussed at the physical gathering. Furthermore, participants such as facilitators and physical gathering leaders using computer system 110 may have access to additional information during the physical gathering and after the physical gathering. For example, facilitators and physical gathering leaders may use the additional information to address real-time issues that occur at the physical gathering as well as improving future physical gatherings.

Figure 3:
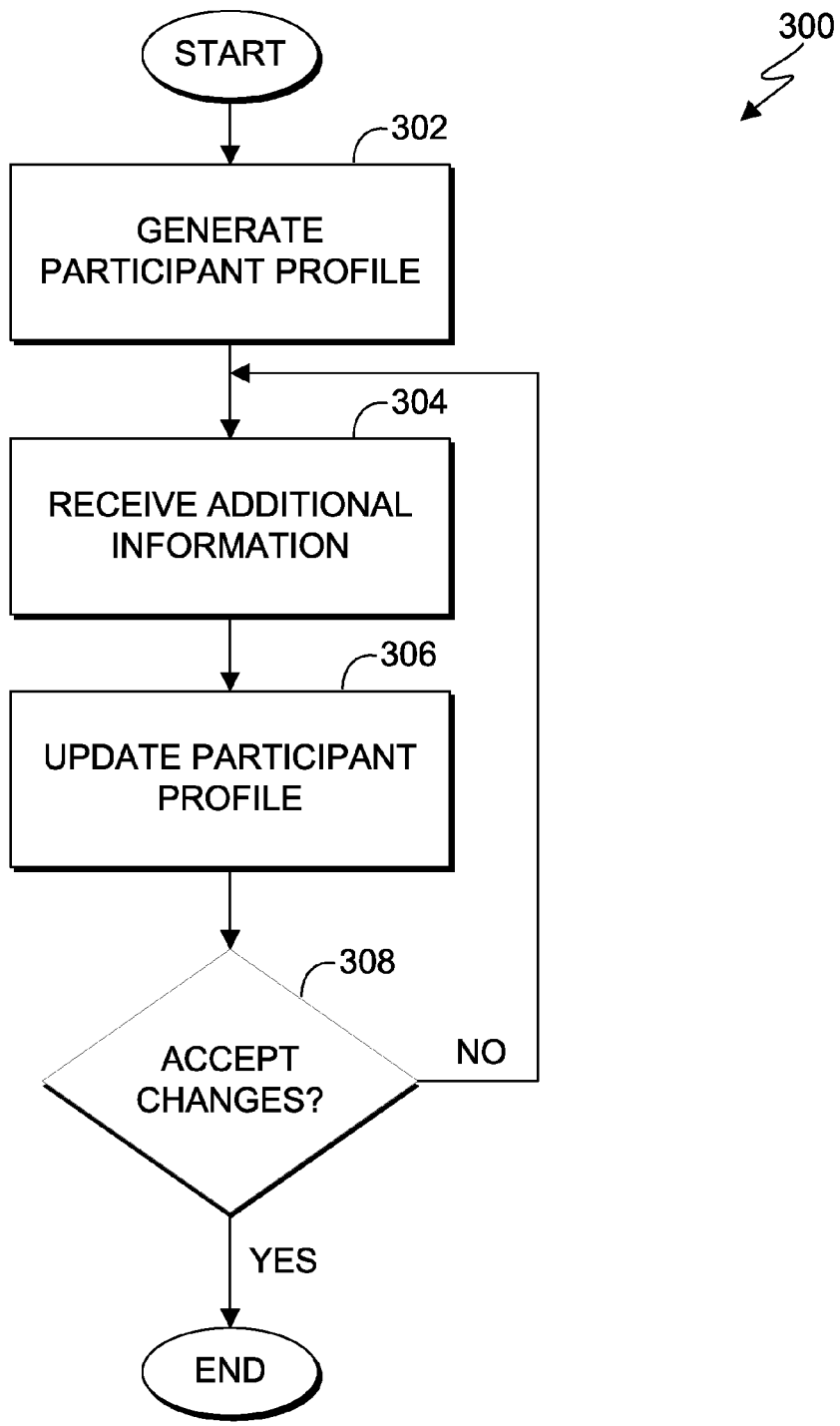
FIG. 3 is a flowchart illustrating operational steps for generating and updating a participant profile, in accordance with an embodiment of the present invention.

FIG. 3 is a flowchart 300 illustrating operational steps for generating and updating a participant profile, in accordance with an embodiment of the present invention. In this embodiment, three types of participants may use computer system 110 including, attendees, facilitators, and physical gathering leaders. Furthermore, participants using host computer system 120, including facilitators and administrators, may distribute a unique computer system similar to computer system 110 at the start of a physical gathering to each participant of the physical gathering. It should be understood that, operational steps described herein may be performed by participants at the physical gathering using computer system 110 at any time throughout the duration of the physical gathering or prior to the physical gathering (i.e., participant registration to generate profile).

In step 302, computer system 110 generates a profile for a participant of a physical gathering. The participant profile includes basic information (e.g., type of participant, subject matters of interest, expertise on the subject matters of interest, speakers of interest, etc.). In one embodiment, the participant profile is previously generated from a registration process for the physical gathering. In another embodiment, the participant may provide profile information for the participant profile once the participant has access to computer system 110 at the physical gathering. Furthermore, the participant profile may be stored in repository 130 of host computer system 120.

In step 304, computer system 110 receives additional information associated with the participant. In one embodiment, the participant of the physical gathering using computer system 110 provides updates to information for the participant profile. For example, the participant may not have enjoyed a particular subject matter field prior to attending an event at the physical gathering involving the particular subject matter field. In this instance, the participant may provide additional information to computer system 110 (e.g., a new interest for the particular subject matter field). In another embodiment, additional information associated with the participant may be provided by external data sources (e.g., employer data, etc.). In one embodiment, operational steps described herein (step 304) may be optional.

In step 306, computer system 110 updates the participant profile for the participant. In one embodiment, subsequent to receiving additional information associated with the participant, computer system 110 updates the participant profile to reflect the additional information received by computer system 110. In one embodiment, computer system 110 updates the participant profile stored in repository 130. In another embodiment, operational steps described herein (step 306) may be optional.

In step 308, computer system 110 determines whether the participant wishes to accept the modifications to the participant profile associated with the participant. In this embodiment, subsequent to computer system 110 updating the participant profile, computer system 110 prompts the participant using computer system 110 to select whether accept the modifications to one or more portions of the participant profile. In this instance, computer system 110 determines whether the participant wishes modify the participant profile associated with the participant subsequent to generating and updating the participant profile as described by step 302 and 306. In another embodiment, operational steps described herein (step 308) may be optional.

If in step 308, computer system 110 determines that the participant does not wish to accept the modifications to the participant profile, then in step 304, computer system 110 receives additional information associated with the participant. For example, if the updated participant profile misrepresents information associated with the participant, then the participant may select to modify the participant profile to more accurately reflect information associated with the participant.

If in step 308, computer system 110 determines that the participant does wish to accept the modifications to the participant profile, then generation of the participant profile associated with the participant using computer system 110 is complete.

It should be understood that, host computer system 120 may perform operational steps described in FIG. 3 instead of computer system 110. In this instance, host computer system 120 receives necessary information to facilitate operational steps for generating and updating a participant profile, in accordance with an embodiment of the present invention. Furthermore, additional procurement operational steps may be included prior to the performing operational steps described in FIG. 3. For example, an administrator may determine necessary information pertinent to the physical gathering prior to the start of the physical gathering. In this instance, the administrator may distribute the necessary information to a list of attendees. Furthermore, attendees receive the necessary information and input attendee information which is used to generate and/or update a participant profile. Accordingly, computer system 110, and in some instances host computer system 120, evaluate generated and/or updated participant profiles to enhance the physical gathering experienced, based on the participant profile (e.g., custom recommendations, pre-requisite readings, videos, etc.).

Figure 4:
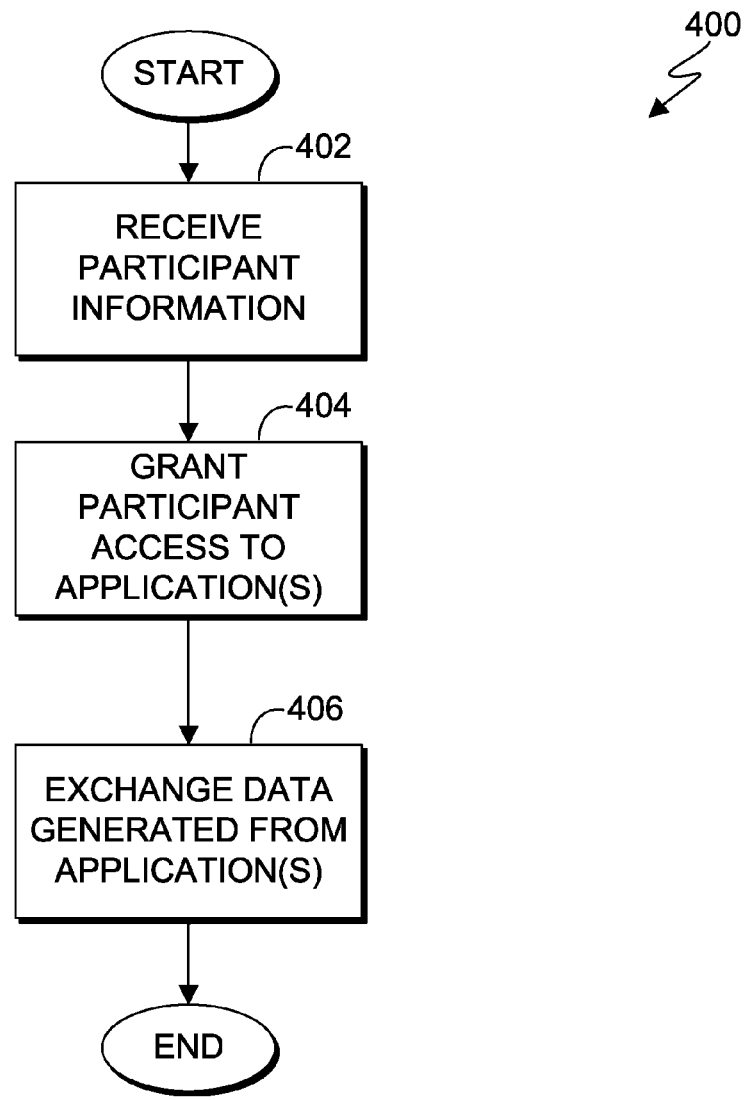
FIG. 4 is a flowchart illustrating operational steps for leveraging social networks in physical gatherings, in accordance with an embodiment of the present invention.

FIG. 4 is a flowchart 400 illustrating operational steps for leveraging social networks in physical gatherings, in accordance with an embodiment of the present invention. As previously discussed, three types of participants may use computer system 110 including, attendees, facilitators, and physical gathering leaders. In this embodiment, each type of participant has unique access to one or more applications 112 and to one or more functions of the one or more applications 112, as previously described with regard to FIG. 2.

In step 402, computer system 110 receives participant information. In one embodiment, computer system 110 detects that a participant arrives at the physical gathering and retrieves a participant profile associated with the participant using computer system 110. For example, computer system 110 may detect that the participant arrived at the physical gathering upon receiving an input from the participant or another participant (e.g., a facilitator, registration desk volunteer, etc.) indicating that the participant arrived. In this embodiment, computer system 110 receives the participant profile from a repository of a host computer system (e.g., repository 130 of host computer system 120). Accordingly, the participant profile indicates whether the participant is an attendee, facilitator, or physical gathering leader, which is information required for subsequent interaction between the participant and computer system 110.

In step 404, computer system 110 grants access to one or more applications 112 based, at least in part, on the type of participant using computer system 110. In one embodiment, computer system 110 identifies the type of participant and profile information by analyzing the participant profile associated with the participant. As previously discussed in greater detail with regard to FIG. 2, applications 112 and one or more functions of applications 112 may only be available to specific types of participants. For example, an attendee may only be able to view a venue map using mapping component 220. Attendees are provided real-time information such as where they are in a venue or where other participants are in relative position to them. Additional capabilities include virtual communities, alerts, schedules, contacts and other relevant information. In another instance, a physical gathering leader may modify the format of the venue map using mapping component 220. Furthermore, the physical gathering leader may provide the modified venue map to each computer system 110 via network 140.

In step 406, computer system 110 exchanges data generated from applications 112. In one embodiment, a host computer system (e.g., host computer system 120) uses analytic engine 128 to process the generated data and transmit the processed data to necessary components. The generated data from applications 112 is processed to help summarize various aspects of the physical gathering. For example, a physical gathering leader may request a summary of all contacts that were made between participants of the physical gathering. In this instance, data generated from contacts component 226 for each computer system 110 is processed to generate the requested summary (i.e., an aggregation of physical gathering data) for the physical gathering leader. In another example, sponsors (i.e., facilitators) may request to receive a summary of all data generated from applications 112 throughout the duration of a physical gathering. In this instance, the sponsors may request to receive an aggregation of data describing a number of participants that attended a sponsored event. Furthermore, the sponsors may use analytic engine 128 to analyze the aggregated data describing the number of participants that attended the sponsored event. For example, the sponsors may request information that describe experiences of the participants that attended the sponsored event, such as whether the participants thought that the sponsored event was informative, the venue was too small or large, the speaker was engaging or not engaging, etc.

In another embodiment, host computer system 120 uses components therein (e.g., analytic engine 128) to receive and analyze data generated by applications 112, such as topics of conversations taken place at the physical gathering between two or more participants. For example, computer system 110 may actively monitor conversations between participants at the physical gathering using language support component 222 of computer system 110. In this instance, computer systems similar to computer system 110 transmits data generated by language support component 222 and other applications 112 to host computer system 120 for subsequent analysis. Furthermore, host computer system 120 may analyze the data generated by language support component 222 and other applications 112 (e.g., mapping component 220) to identify one or more topics of conversation between two or more participants, the types of participants discussing the one or more topics of conversation, and where the participants are located at the physical gathering that are discussing the one or more topics of conversation. Accordingly, host computer system 120 may transmit the analyzed data to computer system 110, such that a participant using computer system 110 can leverage the analyzed data to more easily interact with participants that have knowledge of, or discuss topics of conversation that the participant expresses interest in. In yet another embodiment, host computer system 120 may automatically transmit analyzed data to computer system 110 based on a participant profile associated with the participant using computer system 110. For example, the participant profile may indicate that the participant using computer system 110 wishes to be notified when conversations are taking place between all participants that are guest speakers, as well any conversation that involves a specific topic (i.e., cloud analytics).

Figure 5:
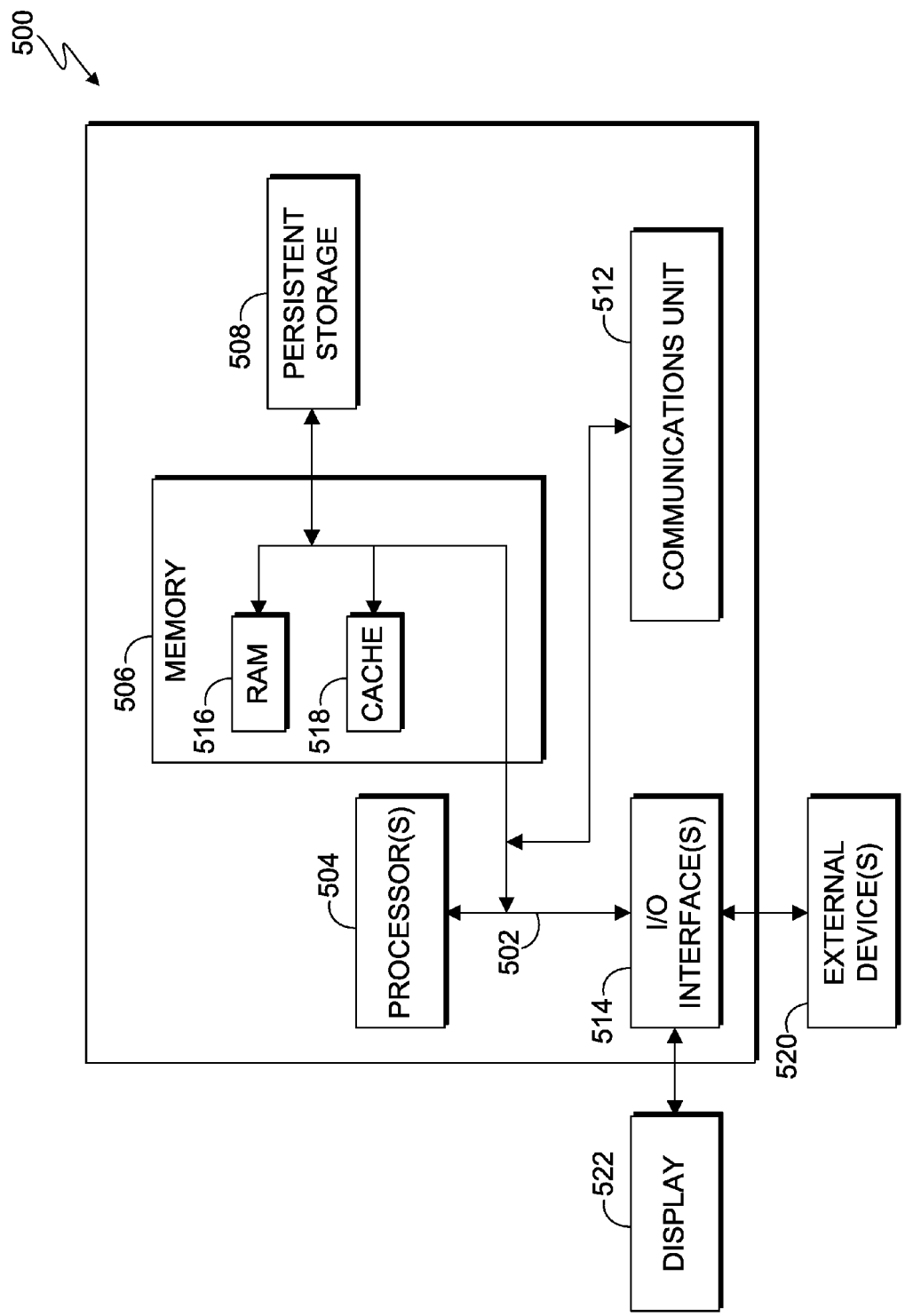
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing computer readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 512 provides for communications with other computer systems or devices via a network (e.g., network 140). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 500 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for leveraging social networks in physical gatherings, the method comprising:
   generating, by one or more computer processors, a profile for each participant of one or more participants at a physical gathering;
   receiving, by one or more computer processors, data from one or more computer systems associated with the one or more participants of the physical gathering, wherein each participant of the one or more participants is associated with a computer system;
   receiving, by one or more computer processors, a request for information from a computer system associated with a first participant of the one or more participants of the physical gathering;
   determining, by one or more computer processors, whether the first participant has access to the information requested based on the profile for the first participant;
   responsive to determining that the first participant has access to the information requested, analyzing, by one or more computer processors, the data received from the one or more computer systems associated with the one or more participants of the physical gathering to identify data to provide to the first participant to fulfill the request for information, wherein analyzing the data comprises:
      identifying, by one or more computer processors, a conversation between two or more participants at the physical gathering discussing a topic based on the data received from the one or more computer systems;
      analyzing, by one or more computer processors, a profile for each participant of the two or more participants to identify profile information for each of the two or more participants; and
      storing, by one or more computer processors, the conversation and the identified profile information for each participant of the two or more participants of the conversation; and
   providing, by one or more computer processors, the identified data to the computer system associated with the first participant of the physical gathering.

2. The method of claim 1, wherein the step of generating the profile for each participant of the one or more participants at the physical gathering comprises:
   for each participant of the one or more participants at the physical gathering:
      receiving, by one or more computer processors, a first information associated with a participant of the one or more participants at a first time;
      creating, by one or more computer processors, the profile for the participant of the one or more participants;
      receiving, by one or more computer processors, a second information associated with the participant of the one or more participants a second time; and
      updating, by one or more computer processors, the profile for the participant of the one or more participants based on the second information.

3. The method of claim 1, wherein the data from the one or more computer systems associated with the one or more participants of the physical gathering includes one or more of the following:
   location data, contact data, mapping data, status data, and active conversation data.

4. The method of claim 1, wherein the request for information received from the computer system associated with the first participant of the one or more participants of the physical gathering includes a request for conversations of a particular topic.

5. The method of claim 4, wherein the step for providing the identified data to the computer system associated with the first participant of the physical gathering comprises:
   providing, by one or more computer processors, the identified conversation and the identified profile information for each participant of the two or more participants of the conversation to the computer system associated with the first participant.

6. The method of claim 1, further comprising:
   aggregating, by one or more computer processors, the received data from each participant of the one or more participants of the physical gathering to create a summary of the physical gathering;
   receiving, by one or more computer processors, a request for summary information from a second participant of the one or more participants, wherein the second request for information includes one or more portions of the created summary of the physical gathering;
   determining, by one or more computer processors, whether the second participant has access to the summary information requested based on the profile for the second participant;
   responsive to determining that the first participant has access to the summary information requested, analyzing, by one or more computer processors, the created summary to identify one or more portions of the summary to provide to the second participant to fulfill the request for summary information; and
   providing, by one or more computer processors, the identified one or more portions of summary to the computer system associated with the second participant of the physical gathering.

7. A computer program product for leveraging social networks in physical gatherings, the computer program product comprising:
   one or more computer readable storage media and program instructions stored on the one or more computer readable storage media, the program instructions comprising:
   program instructions to generate a profile for each participant of one or more participants at a physical gathering;
   program instructions to receive data from one or more computer systems associated with the one or more participants of the physical gathering, wherein each participant of the one or more participants is associated with a computer system;
   program instructions to receive a request for information from a computer system associated with a first participant of the one or more participants of the physical gathering;
   program instructions to determine whether the first participant has access to the information requested based on the profile for the first participant;
   program instructions to, responsive to determining that the first participant has access to the information requested, analyze the data received from the one or more computer systems associated with the one or more participants of the physical gathering to identify data to provide to the first participant to fulfill the request for information, wherein the program instructions to analyze the data comprise:
      program instructions to identify a conversation between two or more participants at the physical gathering discussing a topic based on the data received from the one or more computer systems;
      program instructions to analyze a profile for each participant of the two or more participants to identify profile information for each of the two or more participants; and
      program instructions to store the conversation and the identified profile information for each participant of the two or more participants of the conversation; and
   program instructions to provide the identified data to the computer system associated with the first participant of the physical gathering.

8. The computer program product of claim 7, wherein the program instructions to generate the profile for each participant of the one or more participants at the physical gathering comprise:
   for each participant of the one or more participants at the physical gathering:
      program instructions to receive a first information associated with a participant of the one or more participants at a first time;
      program instructions to create the profile for the participant of the one or more participants;
      program instructions to receive a second information associated with the participant of the one or more participants a second time; and
      program instructions to update the profile for the participant of the one or more participants based on the second information.

9. The computer program product of claim 7, wherein the data from the one or more computer systems associated with the one or more participants of the physical gathering includes one or more of the following:
   location data, contact data, mapping data, status data, and active conversation data.

10. The computer program product of claim 7, wherein the request for information received from the computer system associated with the first participant of the one or more participants of the physical gathering includes a request for conversations of a particular topic.

11. The computer program product of claim 10, wherein the program instructions to provide the identified data to the computer system associated with the first participant of the physical gathering comprise:
   program instructions to provide the identified conversation and the identified profile information for each participant of the two or more participants of the conversation to the computer system associated with the first participant.

12. The computer program product of claim 7, wherein the program instructions stored on the one or more computer readable storage media further comprise:
   program instructions to aggregate the received data from each participant of the one or more participants of the physical gathering to create a summary of the physical gathering;
   program instructions to receive a request for summary information from a second participant of the one or more participants, wherein the second request for information includes one or more portions of the created summary of the physical gathering;
   program instructions to determine whether the second participant has access to the summary information requested based on the profile for the second participant;
   program instructions to, responsive to determining that the first participant has access to the summary information requested, analyze the created summary to identify one or more portions of the summary to provide to the second participant to fulfill the request for summary information; and
   program instructions to provide the identified one or more portions of summary to the computer system associated with the second participant of the physical gathering.

13. A computer system for leveraging social networks in physical gatherings, the computer system comprising:
   one or more computer processors;
   one or more computer readable storage media;
   program instructions stored on the one or more computer readable storage media for execution by at least one of the one or more processors, the program instructions comprising:
   program instructions to generate a profile for each participant of one or more participants at a physical gathering;
   program instructions to receive data from one or more computer systems associated with the one or more participants of the physical gathering, wherein each participant of the one or more participants is associated with a computer system;
   program instructions to receive a request for information from a computer system associated with a first participant of the one or more participants of the physical gathering;
   program instructions to determine whether the first participant has access to the information requested based on the profile for the first participant;
   program instructions to, responsive to determining that the first participant has access to the information requested, analyze the data received from the one or more computer systems associated with the one or more participants of the physical gathering to identify data to provide to the first participant to fulfill the request for information, wherein the program instructions to analyze the data comprise:
  program instructions to identify a conversation between two or more participants at the physical gathering discussing a topic based on the data received from the one or more computer systems;
  program instructions to analyze a profile for each participant of the two or more participants to identify profile information for each of the two or more participants; and
  program instructions to store the conversation and the identified profile information for each participant of the two or more participants of the conversation; and
  program instructions to provide the identified data to the computer system associated with the first participant of the physical gathering.

14. The computer system of claim 13, wherein the program instructions to generate the profile for each participant of the one or more participants at the physical gathering comprise:
  for each participant of the one or more participants at the physical gathering:
    program instructions to receive a first information associated with a participant of the one or more participants at a first time;
    program instructions to create the profile for the participant of the one or more participants;
    program instructions to receive a second information associated with the participant of the one or more participants a second time; and
    program instructions to update the profile for the participant of the one or more participants based on the second information.

15. The computer system of claim 13, wherein the data from the one or more computer systems associated with the one or more participants of the physical gathering includes one or more of the following:
  location data, contact data, mapping data, status data, and active conversation data.

16. The computer system of claim 13, wherein the request for information received from the computer system associated with the first participant of the one or more participants of the physical gathering includes a request for conversations of a particular topic.

17. The computer system of claim 16, wherein the program instructions to provide the identified data to the computer system associated with the first participant of the physical gathering comprise:
  program instructions to provide the identified conversation and the identified profile information for each participant of the two or more participants of the conversation to the computer system associated with the first participant.

* * * * *